INVENTORS
ROSSER L. WILSON
ERWIN R. KNAUER
BY
*Wallace and Cannon*

ATTORNEYS

FIG. 5

INVENTORS
ROSSER L. WILSON
ERWIN R. KNAUER
BY
Wallace and Cannon
ATTORNEYS

United States Patent Office 2,778,008
Patented Jan. 15, 1957

2,778,008

WHEEL SLIP DETECTOR

Rosser L. Wilson, Mahwah, and Erwin R. Knauer, Woodcliff Lake, N. J., assignors to American Brake Shoe Company, Wilmington, Del., a corporation of Delaware Application March 7, 1952, Serial No. 275,282

15 Claims. (Cl. 340—268)

This invention relates to control apparatus for railway equipment and particularly it relates to such apparatus for detecting undesired slipping or sliding of the wheels of such equipment.

In railway locomotives such as diesel electric locomotives, independent drive motors are afforded for each driven axle so that such axles are in effect relatively rotatable and, under the influence of varying rail-wheel friction, may tend to slip in varying amounts. Such slipping of a wheel pair has in the past been detected by comparison of the speeds of two or more wheels, as for example, in Wilson Patent No. 2,335,984, patented December 7, 1943, and suitable corrective measures have been applied in response to such detection, and it is the primary object of the present invention to enable such detection to be attained in an improved and simplified manner. Another and related object is to enable the detecting operations in such an instance to be effective to indicate other objectionable conditions such as a wheel slide condition, a locked wheel condition as well as failure of the usual corrective measures to restore slipping wheels to a normal driving relation.

In prior detecting circuits of the general kind disclosed in the aforesaid patent, as well as in detecting circuits used in synchronizers such as those disclosed in Wilson Patent Nos. 2,232,753, 2,232,896 and 2,443,437, it has been necessary to increase the number of commutator bars in the rotary switches in substantially direct proportion to the increase in the number of rotating elements involved in the speed comparison operation, and this has been considered in some instances to be an objectionable limitation of such detecting circuits. Thus in such prior arrangements a master commutator, which was associated with a master shaft, had its commutator bars allocated to different groups, each containing a series of equally spaced bars, and one such group was required for each secondary shaft that was to be compared with the speed of the master shaft. This was required to assure proper and accurate operation of the detecting means, and led, of course, to excessive size of the commutators, and also required an excessive amount of wiring between the several commutators.

It is, therefore, a further object of this invention to simplify detecting means of the aforesaid character, and more specifically, it is an object of the invention to enable a single such group of master commutator segments to serve two or more secondary commutators, thereby to simplify the commutator construction and to accomplish this in such a way as to simplify and reduce the wiring required between such commutators.

Other and further objects of the present invention will be apparent from the following description and claims and are illustrated in the accompanying drawings which, by way of illustration, show preferred embodiments of the present invention and the principles thereof and what we now consider to be the best mode in which we have contemplated applying these principles. Other embodiments of the invention embodying the same or equivalent principles may be used and structural changes may be made as desired by those skilled in the art without departing from the present invention and the purview of the appended claims.

Figure 1:
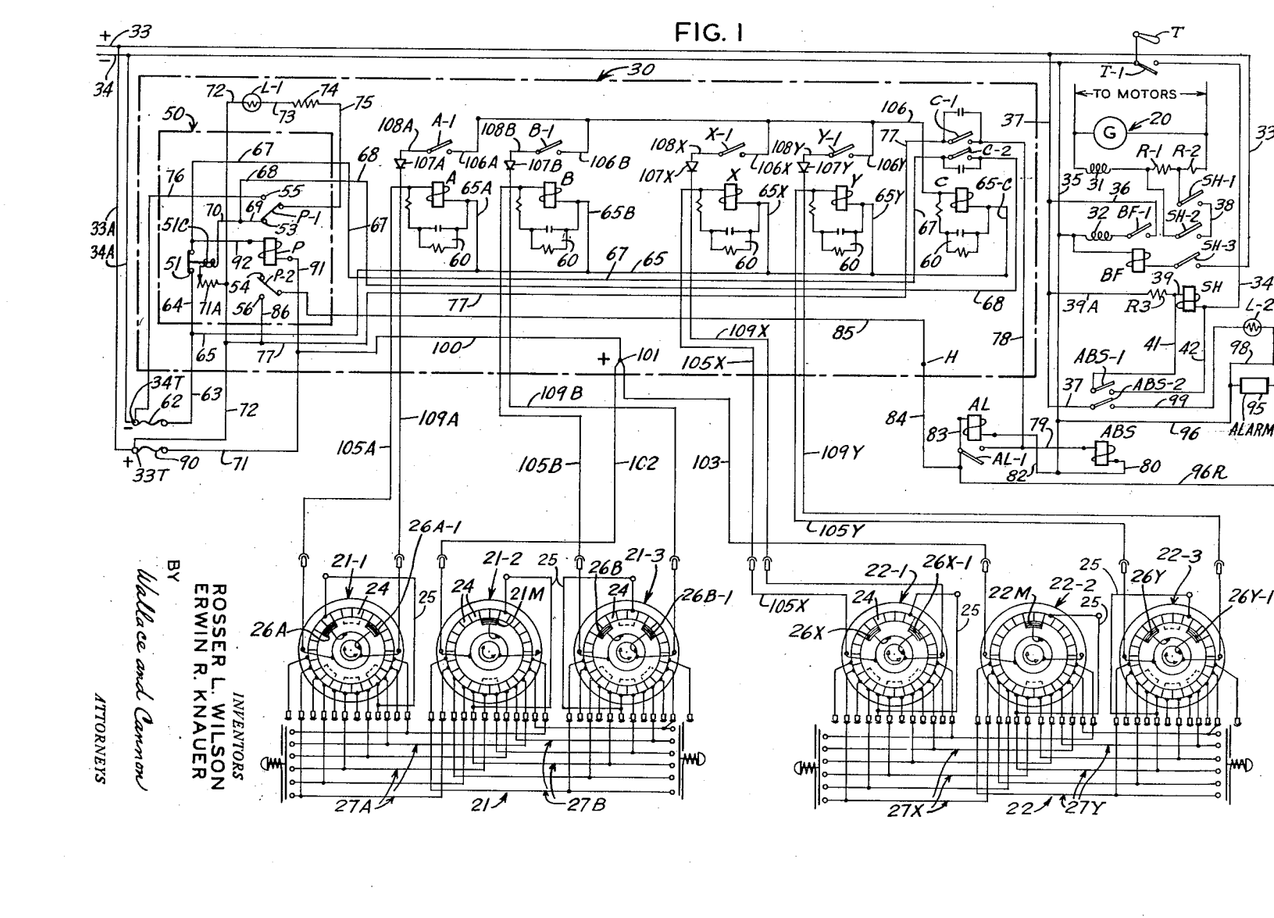
Fig. 1 is a schematic wiring diagram illustrating a control system embodying the features of the invention.

For purposes of disclosure the invention is herein illustrated in Fig. 1 as embodied in control apparatus for use on diesel electric locomotives where a single generator 20 is utilized to afford electric power for operating the independent drive motors for two three-axle, six-wheel trucks. Thus, in Fig. 1, two three-axle trucks 21 and 22 are indicated generally, and have the axles thereof respectively indicated in a schematic manner by rotary switches 21–1, 21–2, and 21–3 and 22–1, 22–2 and 22–3. These rotary switches may be of the general type shown in Wilson Patent No. 2,320,809, patented June 1, 1943, and each such switch includes a stationary commutator section and one or more rotative brush elements connected to the related axle so as to be driven thereby. Thus, each such rotary switch as herein shown has twenty-four commutator segments 24, and diametrically opposite segments 24 in each such switch are electrically connected by wire 25, only one of which wires has been illustrated in each switch. The switch 21–2 constitutes what may be termed the master switch in respect to the axles of its truck 21, and this switch has a single master brush 21–M. The switch 21–1 has two brushes 26A and 26A–1 that are spaced angularly from each other about 90 degrees. Similarly, the switch 21–3 has brushes 26B and 26B–1. The switch 22–2 has a single master brush 22–M, the switch 22–1 has two brushes 26X and 26X–1, while the switch 22–3 has two brushes 26Y and 26Y–1.

Alternate segments 24 of the master switch 21–2 are connected by wires 27A and 27B to corresponding segments of the respective switches 21–1 and 21–3, and wires 27X and 27Y similiarly associate the segments of the switches 22–1 and 22–3 with the master switch 22–2.

The rotary switches 21 and 22 are utilized in association with a relay panel 30 to effect control operations which include the reduction of the power output of the generator 20 for a short interval whenever there is an objectionable difference in the speed of one of the axles with respect to another of the axles, as for example when one axle overspeeds or slips. Thus, it is customary in diesel-electric locomotives to provide an independent electric motor for each driven axle, and where three axles are provided in each truck, at least two of these axles are driven in every instance and in some cases all three axles of the truck are driven by independent drive motors. The varying wheel-rail friction conditions effective on the wheels of the independently driven axles often result in over-driving or slipping of one or more of these axles, and to correct this condition, the output of the generator 20 is reduced for a short interval through the controlling action of the present equipment, as will be explained hereinafter. Thus the generator 20 is illustrated as being of a conventional type having a field winding 31 in series with resistances R–1 and R–2, and having an exciting winding 32. A source of direct current is afforded by means including wires 33 and 34, and one end of the exciting winding is connected by wires 36 and 37 and relay contacts BF–1 of a relay BF to the wire 33 so that the exciting winding is effective when the relay BF is energized. The relay BF has an energizing circuit that is governed by a relay SH which has relay contacts SH–1, SH–2 and SH–3. Thus the relay BF has one end of its operating coil connected to the wire 35 and the other end of its operating coil connected to one contact SH–3, the other contact of which is connected to the wire 33. The stationary elements of the contacts SH–1 and SH–2 are connected together by a wire 38, while the movable elements of these contacts are connected to opposite ends of the resistor R–1. The relay SH has one end of its coil connected by wires 39 and 39A and resistance R–3 to the wire 37, while the other end of this coil is connected to the wire 34 through a switch T–1 which is actuated by the usual throttle T so that the switch T–1 is open when the throttle T is in its "off" position and is closed whenever the throttle T is moved out of its "off" position as when such throttle is moved to its start or running positions.

Thus, when the throttle T is in its start or running position, the relay SH is normally operated, so that its contacts SH–1 and SH–2 shunt the resistor R–1, and the contacts SH–3 close the operating circuit for the relay BF so that the contact BF–1 closes the circuit for the exciting winding 32. When the power output of the generator 20 is to be reduced, the coil of the relay SH is shunted by means including a relay ABS which includes relay contacts ABS–1 and ABS–2. Thus the contacts ABS–1 are connected by wires 41 and 42 respectively to opposite ends of the coil of the relay SH, and hence when the contacts ABS–1 are closed by operation of the relay ABS, the operating coil of the relay SH is shunted and this relay is released so as to cause a reduction in the power output of the generator, by opening the circuit for the exciting winding and adding resistor R–1 in series with the field winding.

The relay panel 30 includes an emergency protection section 50 having a cut-out switch 51 having an operating coil 51C for actuating the movable contact of the switch 51 to its open position, and this switch is of the type that latches in its open position so as to require a manual re-setting operation to again close the cut-out switch. The protection section 50 of the panel 30 also includes a relay P having movable contacts P–1 and P–2, and when the relay P is energized, the contact P–1 thereof engages a contact 53 and contact P–2 thereof engages an un-used contact 54. When the relay P is released, the contact P–1 engages a contact 55 and the contact P–2 engages a contact 56.

The relay panel 30 also includes a pair of slow-to-release relays A and B allocated to the truck 21 for co-operation with the switches of this truck in detecting undesired variations in the relative speeds of the wheels of this truck; a pair of slow-to-release relays X and Y allocated to the truck 22 for the same purpose, and a power relay C that is of the slow-to-release type and which is governed by any one of the relays A, B, X or Y, so as to govern the relay ABS as well as other elements of the apparatus, as will be described. The relays A, B, X, Y and C have similar condenser-resistance units 60 connected across the coils thereof to impart the slow-to-release characteristics thereto; and the relays A, B, X and Y each have single relay contacts A–1, B–1, X–1 and Y–1, respectively, while the relay C has contacts C–1 and C–2.

Power connections for the panel are afforded from the wires 33 and 34 respectively to terminals 33T and 34T by wires 33A and 34A. The negative side of the circuit is extended from the terminal 34T through a fuse 62 and wires 63 and 64 in series to one stationary contact of the switch 51, while a wire 65 extended from the wire 63 has branch leads 65A, 65B, 65X, 65Y and 65C extended to one end of the coils of the respective relays A, B, X, Y and C. An un-fused connection is also extended from the terminal 34T by a wire 76 to the contact 55 of the relay P for purposes that will be explained hereinafter. The fused circuit from the terminal 34T is extended from the other stationary contact of the cut-out switch 51 by a wire 67 that is connected to the movable element of the contacts C–2, the stationary element of which has a wire 68 extended therefrom to the protection section 50 where it has a first branch wire 69 extended to the contact 53 and a second branch wire 70 extended to one terminal of the operating coil 51C. The other terminal of the operating coil 51C is connected to the adjustable element of a rheostat 71A, the resistance element of which is connected to a wire 72 which extends in an un-fused relation from the terminal 33T. The wire 72 also extends to one terminal of a signal light L–1, and a wire 73, a resistance 74 and a wire 75 continue this circuit to the movable contact P–1, and when the relay P is operated, as it is during normal functioning of the apparatus, this circuit extends through the contact 53, wires 69 and 68 and to the relay contacts C–2, thus to condition a circuit that may be closed by operation of the relay C. When the relay C is operated this conditioned circuit is extended by the wire 67, the switch 51, wires 64 and 63 and the fuse 62 to the terminal 34T, thus to afford an energizing circuit for the light L–1 when the relay C is operated. A similar energizing circuit for the light L–1 is afforded during periods when the relay P is released, as by a wire 76 extended from the contact 55 to the terminal 34T in an unfused relation.

The unfused circuit from the terminal 33T is extended from the wire 72 by a wire 77 to the movable contact C–1, and from the stationary contact C–1, a wire 78 and wire 79 extended therefrom in series to one terminal of the relay ABS. The other terminal of the relay ABS is connected by a wire 80 to the wire 35, so that the relay ABS will be energized upon closure of the relay contacts C–1. It will be noted that the relay ABS may also be energized under control of a relay AL which has contacts AL–1. The relay AL has one terminal of its coil connected by a wire 82 to the wire 35, and a wire 83 from the other terminal of the relay coil extends to the movable contact AL–1 and has a further connection by a wire 84 to a terminal H in the relay panel 30. A wire 85 from terminal H extends to the movable contact P–2, and when the relay P is released due to opening of the cut-out switch 51, or blowing a fuse, the contact P–2 engages the contact 56 which is connected by a wire 86 to the wire 77. The wire 84 also is connected to wire 96R which is connected to one terminal of the alarm 95. Thus the relay AL is energized and the alarm operated as a direct result of the opening of the cut-out switch 51, or blowing of a fuse.

The relay P has its energizing circuit provided through a fuse 90 and wires 71 and 91 in series from the terminal 33T to one terminal of the relay coil, and a wire 92 from the other terminal of the relay coil, to the wire 67. Thus the relay P is energized so long as the cut-out switch 51 is in its closed position and the two fuses 62 and 90 are operative, and opening of the switch 51, or burning out of either fuse, will cause release of the relay P. The result of such release of the relay P is to light the signal lamp L–1 continuously through an unfused circuit, and to operate the relay AL and an alarm 95 through an unfused circuit.

This operation of the relay AL serves, as above described, to cause operation of the relay ABS so as to reduce the output of the generator 20. The alarm 95 has one terminal connected by a wire 96 to the wire 35, while the other terminal of the alarm 95 is connected by a wire 96R to the wire 84, thus to cause the alarm to be operated whenever the relay P is released. The operation of the relay ABS serves to reduce the power output of the generator 20, as above pointed out, and the operation of the alarm 95 serves to indicate that the control operation is abnormal; it being noted that any control operation, whether normal or abnormal, is indicated by a signal light L–2 which has one of its terminals connected by wires 99 to the stationary contact ABS-2, the movable contact ABS-2 being connected to the wire 37. The other terminal of light L-2 is connected to wires 98 and 96 in series to wire 35.

The detecting circuits

In affording the detecting circuits, a wire 100 is extended from the wire 71 to a terminal 101, and from this terminal wires 102 and 103 are extended through conventional sockets and slip ring structures to the respective master brushes 21M and 22M. Similarly, wires 105A, 105B, 105X and 105Y extend through conventional slip ring structures and sockets from the brushes 26A, 26B, 26X and 26Y to the respective other terminals of the relays A, B, X and Y. The relay C has the other terminal of its coil connected by a wire 106 and branch leads 106A, 106B, 106X and 106Y to the respective stationary terminals of the relay contacts A-1, B-1, X-1 and Y-1, and the movable relay contacts A-1, B-1, X-1 and Y1, are respectively connected to one terminal of rectifiers 107A, 107B, 107X and 107Y by wires 108A, 108B, 108X and 108Y. The other terminals of the rectifiers 107A, 107B, 107X and 107Y are connected respectively by wires 109A, 109B, 109X and 109Y through appropriate plug sockets and slip rings to the brushes 26A-1, 26B-1, 26X-1 and 26Y-1.

Operation of control apparatus of Fig. 1

The control apparatus of Fig. 1 functions to detect and to indicate objectionable speed differences of the several axles regardless of the cause of such objectionable differential, and in the form illustrated, the operation of the relay C in response to such detection is utilized to correct this condition when it is due to slipping, while the indicating or signal lights serve in the course of a braking operation to warn the engineer that the braking power should be reduced by the normal manual means. It will be recognized, of course, that the automatic reduction of the braking power may be attained, or automatic rail sanding may be effected under control of the relay C as taught for example in the prior Patent No. 2,232,752 patented February 25, 1941, in addition to the reduction of driving power as will be explained in connection with the illustrated embodiment of the present invention.

In attaining the desired operation of the present apparatus, the rate of permissible relative rotation of the wheels is first established, having regard to normal wheel diameter variations, as described in the aforesaid Patent No. 2,232,752, and the time interval required at this relative speed for the brush 21M to move out of electrical connection or contact with the brush 26A and into connection or contact with the brush 26A-1 is determined. This, of course, takes into consideration the width or angular extent of the brush 21M, and the time interval thus established is used as the release period of the relays A, B, X and Y. Hence, when there is relative rotation at a rate exceeding such permissible rate, in either direction or sense, a circuit will be completed through the brush 26A and the brush 26A-1 in a time period less than the release period of the relay A, as will be described in further detail hereinafter. More specifically, it will be noted that in the course of relative rotation of the brushes of the switches 21-1 and 21-2, the brush 21M and the brush 26A will move into corresponding angular relation so that an energizing circuit from the positive terminal 101 through the master brush 21M, the wires 27A, the brush 26A and the wire 105A through the relay A and wires 65A, 65 and 63 in series to the negative terminal, thus to operate the relay A. This energizing circuit is maintained until such relative rotation moves the brushes 21M and 26A out of their electrically connected relation, and when the circuit is broken, the relay A remains in its operated condition due to its slow-to-release characteristics, and the release period of such relay A starts to run.

If the rate of relative rotation is below the permissible figure that has been established as above discussed, the relay A will release before the brushes 21M and 26A-1 move into an electrically connected relation, and no control or indicating operation will take place. If, however, the rate of relative rotation exceeds the predetermined maximum, the brushes 21M and 26A-1 will move into electrical association while the relay A is still in its operated condition, or in other words, before expiration of the release period of this relay, and this is effective through the then closed relay contacts A-1 to establish an energizing circuit of the relay C. Thus the operating circuit for the relay C extends from the positive terminal 101 through the master brush 21M, the wires 27A, the brush 26A-1, the wire 109A, the rectifier 107A, the wire 108A, the closed relay contacts A-1, the wires 106A and 106, coil of the relay C and wires 65C, 65 and 63 to the negative terminal 34T. The relay C is thus operated so as to initiate a control operation as well as the related indicating operation, the duration of which will be at least as long as the release period of the relay C.

Such operation of the relay C causes operation of the relay ABS with a resulting release of the relays SH and BF so that the power output of the generator 20 is reduced; and hence the driving power of all of the individual drive motors supplied from such generator will be reduced so that any over-speeding or slipping wheels will have an opportunity to re-establish their normal driving relationship with the rails.

During the time that the relay C is thus operated, the fact of such operation is indicated by the indicator lamp L-2 that is energized through the relay contacts ABS-2, and is further indicated by the lamp L-2 that is energized through a circuit that includes the relay contacts C-2, the wires 68 and 69, the relay contacts 53 P-1, and the wire 75. This last mentioned circuit also branches through the wire 70 and through the operating coil 51C of the safety cut-out switch 51, and this switch 51 is arranged to open when the relay C has been operated for more than a pre-determined period. This period is usually set at about fifteen seconds by adjustment of the rheostat 71A.

The cut-out or safety switch 51 latches in its open position, as above pointed out, and when thus opened, breaks the circuit to the wire 67 which has formed part of the energizing circuit for the light indicating lamp L-1, and also breaks the circuit for the relay P. The resulting release of the relay P re-establishes the circuit for the indicating lamp L-1 which will then operate continuously so as to thereby indicate that an abnormal control operation is taking place, and this same fact is indicated at the same time, and preferably at another location on the locomotive, by the operation of the alarm 95 concurrently with the indicating lamp L-2. Ordinarily the indicating lamp L-2 and the alarm 95 are located in the cab of the lead unit of the locomotive, and the operation of the system shown in Fig. 1 is such as to correct wheel spin and to give a lamp indication by means of the lamp L-2 to show presence of a wheel spin or wheel slide condition, and to additionally afford an alarm by means of the alarm 95 when there is a locked wheel or a blown fuse.

It will be noted that under and in accordance with the present invention, the speed comparison of a secondary rotatable element with respect to a master rotatable element requires but a single relay. Moreover, such simplicity of structure and circuitry is capable of use with two secondary rotatable members, as will be evident from Fig. 1 of the drawings. In this latter respect, however, it is pointed out that such extension of the single-relay comparison detection system tends toward the creation of undesired feed-back circuits, and this tendency may be corrected by the provision of rectifiers 107.

Figure 2:
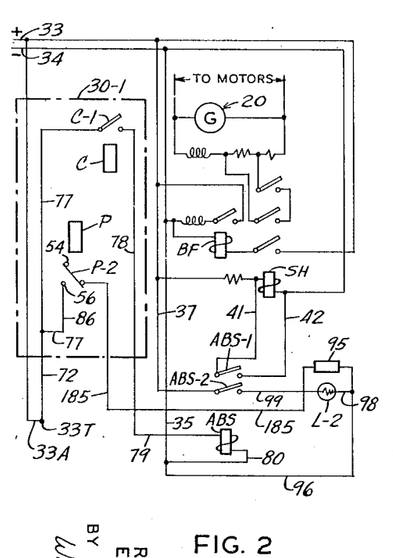
Figs. 2, 3 and 4 are simplified wiring diagrams illustrating alternative embodiments of the invention.

In Fig. 2 of the drawings a circuit arrangement is illustrated which attains a somewhat different indicating and alarm operation than the system of Fig. 1, and the system of Fig. 2 is somewhat simplified in that the relay AL is not required. For purposes of illustration, the system of Fig. 2 is fragmentally shown in such a manner as to avoid duplication of many of the elements that are fully shown in Fig. 1. Thus, the generator 20 with the control relays BF, SH and ABS are the same as in the system of Fig. 1, but the energizing circuits for the relay ABS and for the alarm 95 are somewhat different. The relay ABS, in the system of Fig. 2, is energized upon closure of the relay C, the energizing circuit being the same as in Fig. 1 and bearing the same reference characters. Thus the generator output will be reduced and the indicating lamp L-2 will be lighted in response to sliding of a wheel or slipping of a wheel. The relay ABS is not, however, operated upon release of the relay P, the contact P-2 of the relay P being connected by a wire 185 to one terminal of the alarm 95, the other terminal being connected by the wires 96 and 35 to the wire 34. Thus, the relay AL is eliminated in the system of Fig. 2. The alarm 95 is operated to indicate a locked wheel condition or blown fuse. The lamp L-2 is operated only when relay ABS is operated.

Figure 3:
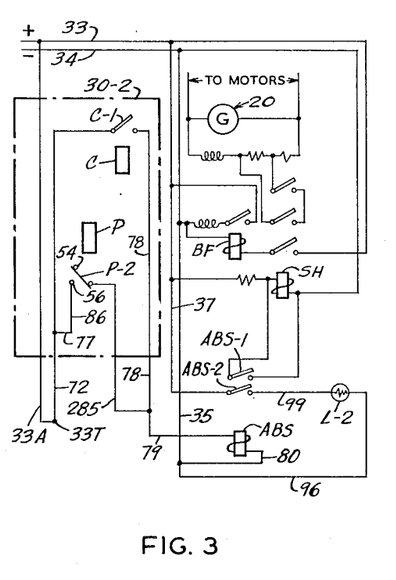

In the embodiment shown in Fig. 3 both the relay AL and the alarm 95 are eliminated, and the contact P-2 of the relay P is connected by a wire 285 to the wire 79, thus to cause an alternative energizing circuit to be completed for the relay ABS when the relay P is released. Thus the indicating lamp L-2 is lighted in response to a wheel slip condition, a wheel slide condition, a locked wheel condition, or a blown fuse, and the power to the motors is reduced in each such instance.

Figure 4:
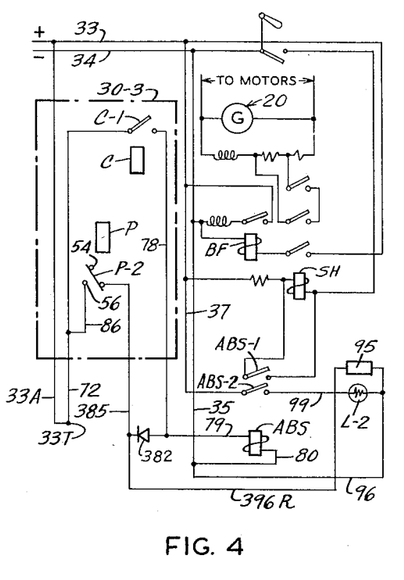

In the embodiment shown in Fig. 4 of the drawings, a rectifier 382 replaces and accomplishes the same result as the AL relay shown in Fig. 1. One terminal of the rectifier 382 is connected by a wire 385 to the contact P-2 of the relay P, the other terminal of the rectifier being connected by a wire 79 to one terminal of the coil of the ABS relay so that the ABS relay will be energized through the rectifier 382 when the relay P is released. An extension 396R from the wire 385 is connected to one terminal of an alarm 95, the other terminal of which is connected to the wire 96, thus to energize the alarm concurrently with the operation of the ABS relay through the rectifier 382. The rectifier 382 prevents the operation of the alarm 95 when relay ABS is operated through contacts C-1 of relay C. Thus the power to the motors will be reduced and the indicating lamp L-2 will be lighted in response to a wheel slip condition, a wheel slide condition, a locked wheel condition or a blown fuse; and in addition, the alarm 95 will be operated when there is a locked wheel or a blown fuse.

It will be recognized of course that in all of the embodiments thus described, an overly long correction period, or repeated detection of a slipping or sliding condition for any cause whatsoever, will cause the cut-out switch 51 to be opened so that the signal or alarm system will function in the same manner as above described in respect to a locked wheel condition.

Figure 5:
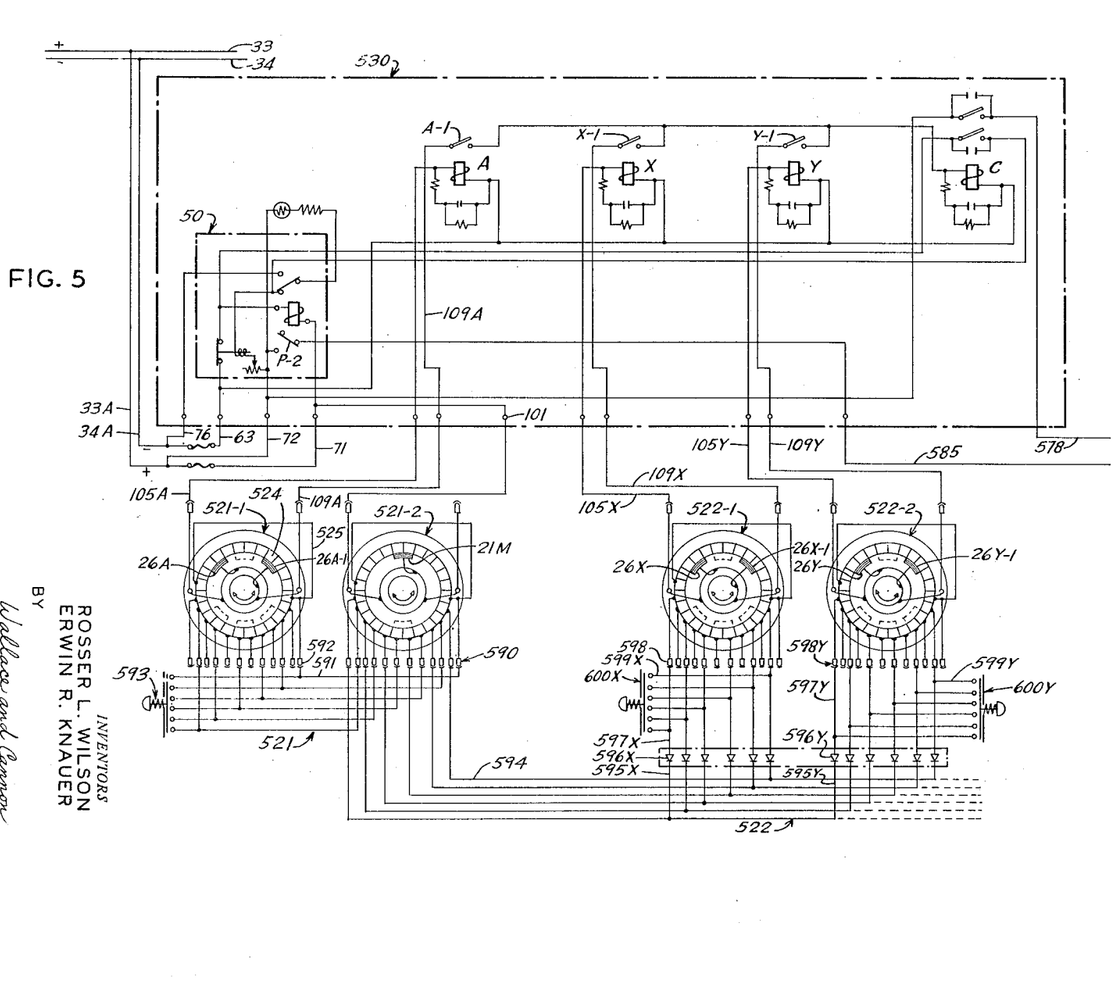
Fig. 5 is a schematic wiring diagram illustrating another embodiment of the invention.

In Fig. 5 of the drawings another embodiment of the invention is illustrated wheren the electrical elements are associated so that a single master switch may cooperate with a larger number of secondary switches than has heretofore been possible. Thus, in Fig. 5, a structure is illustrated that is adapted for use with railway equipment having two trucks 521 and 522, each of which has two axles, for accomplishing controlling and indicating functions such as those accomplished in the previously described embodiments of the invention. The truck 521 has a rotary switch 521-1 associated with one axle thereof while a rotary switch 521-2 is associated with the second axle. Similarly, a rotary switch 522-1 is associated with one axle of the truck 522, and a rotary switch 522-2 is associated with the other axle. The rotary switch 521-1 is identical in form with the previously described rotary switch 21-1, and as herein shown the switch has twenty-four commutator segments 524, and diametrically opposite segments are connected as by wires 525, only one of which is shown herein. The switch 521-1 has similar brushes 26A and 26A-1 that are operated and located in the same manner as in the switch 21-1.

The switch 522-1 has brushes 26X and 26X-1 that are similar in form and relationship to the correspondingly numbered brushes in the rotary switch 22-1. The rotary switch 522-2 has rotary brushes 26Y and 26Y-1 that are similar in form and position to the brushes included in the rotary switch 22-3 of Fig. 1 of the drawings.

The rotary switching mechanism is illustrated in Fig. 5 as being associated with a main relay panel 530 which in most respects is similar to the relay panel 30 illustrated in Fig. 1, its primary difference being that the relay B is eliminated in the panel 530, and the various rectifiers, allocated to individual relays of the panel, such as the rectifier 107A, have been eliminated. Thus the relay panel 530 includes a protection unit 50 that is identical with the similarly numbered unit in the embodiment shown in Fig. 1, and the output from the contact P-2 of this protection unit 50 is extended by a wire 585 which may be operatively associated with the alarm system in the manner shown in any one of Figs. 1 to 4. The wire 585 thus may correspond with wire 85 of Fig. 1, the wire 185 of Fig. 2, the wire 285 of Fig. 3 or the wire 385 of Fig. 4.

In the control panel 530, relays A, X and Y are afforded so that any one of these relays may govern the relay C in the same manner as in the embodiment shown in Fig. 1, and the output or controlling action of the relay C is attained through a wire 578 that may be connected to the control apparatus in the same manner as the wire 78 of Fig. 1.

The rotary switch 521-2 constitutes the master switch, and has a single brush 21M, and this brush is connected through the usual slip-ring and socket arrangement to the contact 101 of the panel 530. The brush 26A is connected by a wire 105A and through the usual slip-ring and socket connection to one terminal of the relay A exactly as in the previously described embodiment, while the brush 26A-1 is connected through slip-ring and socket arrangements by a wire 109-A that extends directly to the movable contact A-1. Thus the connection afforded by the wire 109A does not include a rectifier, but is in other respects similar to the connection utilized in the embodiment shown in Fig. 1.

Similarly, the brush 26X is connected by means including a wire 105X to one terminal of the relay X while the brush 26X-1 is connected by wire 109X directly to the movable contact X-1. The brush 26Y is connected by a wire 105Y to one terminal of the relay Y exactly as in the embodiment shown in Fig. 1, while a wire 109Y extends from the brush 26Y-1 to the movable contact Y-1. Thus the connections 109A, 109X and 109Y are different from the form shown in Fig. 1 in that they do not include rectifiers.

In the embodiment shown in Fig. 5, however, means are afforded for preventing undesired electrical feedbacks, and in this embodiment this result is accomplished in such a way that a single master switch may serve to control and cooperate with a relatively large number of secondary switches. Thus the master switch 521-2 has the segments thereof allocated to two different groups so that alternate segments, that may be considered as the odd numbered segments, constitute one group, and the other or even numbered segments constitute the second group. The odd numbered segments of the switch 521-2 are connected through a suitable plug connector 590, wires 591, and another plug connector 592 to correspondingly numbered segments of the rotary switch 521-1, and a test switch 593 is associated with the wires 591 for conveniently connecting all of the odd numbered segments of the switches 521-1 and 521-2 together for test purposes.

The second group of segments of the master switch

521–2, that is, even numbered segments thereof, are utilized under the present invention in association with more than one secondary switch, the two secondary switches 522–1 and 522–2 being shown in association with this second group of segments in the present instance. Thus the even numbered segments of the switch 521–2 have circuits extending therefrom through the plug connector 590 to wires 594, and from these wires 594, branch leads including rectifying means are extended to the corresponding segments of the secondary switches 522–1 and 522–2. Thus wires 595X are extended from the respective wires 594 and have individual rectifiers 596X connected thereto, additional wires 597X being extended from the other terminals of these rectifiers to a plug connector 598 which extends circuit from the wires 597X to the even numbered segments of the switch 522–1. Branch wires 599X extend from the respective wires 597X to a test switch 600X that is similar to the test switch 593.

Other branch leads 595Y extend from the various wires 594 to individual rectifiers 596Y, and wires 597Y are extended from the other terminals of such rectifiers to a plug connector 598Y which then extends circuit to corresponding even numbered segments of the switch 522–2. Branch wires 599Y extend from the wires 597Y to a test switch 600Y which serves as a test means for the switch 522–2, and which is similar to the switch 593. The wires 594 are illustrated in Fig. 5 as extended by dotted lines to the right, for it will be evident that similar connections, including rectifiers such as the rectifiers 596X and 596Y may be made to additional secondary switches for similar cooperation of these switches with the same group of segments of the master switch.

The detecting action attained through the switch arrangement shown in Fig. 5 controls the relay panel 530 in the same way as hereinbefore described in connection with Fig. 1, and the panel 530 and the protection unit 50 thereof may be associated with the controlled mechanism in the different ways hereinbefore described in connection with Figs. 1 to 4 of the drawings.

It will be recognized, of course, that the extended or added capacity attained with respect to the even numbered segments of the master commutator in the embodiment shown in Fig. 5 may be attained with respect to any similar group of commutator segments such as the odd numbered group included in such master commutator. Thus it will be evident that the present invention simplifies the commutator and wiring arrangements required in detecting variations in the relative speeds of the three or more rotating shafts or elements, and by reducing the amount of wiring required and by simplifying the master commutator requirements, the present invention has rendered this type of detection more readily applicable where minimum weight is a consideration.

From the foregoing description it will also be evident that the present invention enables wheel slipping or sliding conditions to be detected in an improved and simplified manner, and through the use of mechanism that is simplified in character. It will also be apparent that the present invention controls the power to the driven wheels of a locomotive so that presence of undesirable conditions such as a locked wheel, a blown fuse, a wheel sliding or slipping condition, or failure of the usual restorative measures, will in each instance cause power reduction.

The various embodiments of the invention herein illustrated are utilized where there is but one power plant 20 to be controlled, but it will be recognized of course that additional relays corresponding to the relay C and the relay P may be added in association with the appropriate wheels and added power plant or plants so as to attain independent but similar control of such additional power plants.

Thus, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:
1. In an apparatus for detecting an objectionable speed differential between a pair of independently rotatable elements, a pair of commutator switches having corresponding commutator segments electrically interconnected and having rotor elements adapted respectively to be driven from such elements, one of said commutator switches having a single master brush element and the other having first and second brush elements angularly spaced from each other, a slow-to-release relay having a single normally open pair of relay contacts, an energizing circuit for said relay including said single master brush element and said first brush element, and a detecting circuit including said single master brush element, said second brush element and said relay contacts.

2. In an apparatus for detecting the need of a control operation with respect to at least three independently rotatable elements, a master switch operatively associated with one of said elements, secondary switches respectively associated with the other of said elements, each of said switches including a plurality of commutator bars arranged consecutively about the circumference of a circle, the commutator bars of said master switch being arranged in sets in each of which there are as many commutator bar sets as there are secondary switches, means respectively electrically connecting corresponding commutator bars in said sets with commutator bars in a particular secondary switch to thereby connect the commutator bars of the secondary switches with the commutator bars of the master switch in a predetermined manner, said master switch having a single master brush and said secondary switches each having first and second brushes angularly spaced from each other, said brushes being operatively associated with the commutator bars of their respective switches and being driven rotatively by the associated rotatable element, slow-to-release relays allocated one to each of said secondary switches and each having an energizing circuit including said master brush and said first brush of the secondary switch to which the relay is allocated, each of said relays having a set of relay contacts, a final relay, and circuit connections from the respective second brushes to the contacts of the related relay and each including a rectifier, said circuit connections being arranged in parallel and being connected to one end of the operating coil of said final relay to afford an energizing circuit for said final relay including said master brush and any one of said contacts that may be closed.

3. In an apparatus for detecting the need of a control operation with respect to at least three independently rotatable elements, a master switch operatively associated with one of said elements, secondary switches respectively associated with the other of said elements, each of said switches including a plurality of commutator bars arranged consecutively about the circumference of a circle, the commutator bars of said master switch being arranged in sets in each of which there are as many commutator bar sets as there are secondary switches, means respectively electrically connecting corresponding commutator bars in said sets with commutator bars in a particular secondary switch to thereby connect the commutator bars of the secondary switches with the commutator bars of the master switch in a predetermined manner, said master switch having a single master brush and said secondary switches each having first and second brushes angularly spaced from each other, said brushes being operatively associated with the commutator bars of their respective switches and being driven rotatively by the associated rotatable element, slow-to-release relays allocated one to each of said secondary switches and each having an energizing circuit including said master brush and said first brush of the secondary switch to which the relay is allocated, each of said relays having a set of relay contacts, and an indicating circuit including circuit connections from the respective second brushes to the contacts of the related relay and each including a rectifier, said circuit connections being arranged in parallel to said indicating circuit to energize said indicating circuit.

4. In an apparatus for detecting the need of a control operating with respect to at least three independently rotatable elements, a master switch operatively associated with one of said elements, secondary switches respectively associated with the other of said elements, each of said switches including a plurality of commutator bars arranged consecutively about the circumference of a circle, the commutator bars of said master switch being arranged in sets in each of which there are as many commutator bar sets as there are secondary switches, means respectively electrically connecting corresponding commutator bars in said sets with commutator bars in a particular secondary switch to thereby connect the commutator bars of the secondary switches with the commutator bars of the master switch in a predetermined manner, said master switch having a single master brush and said secondary switches each having first and second brushes angularly spaced from each other, said brushes being operatively associated with the commutator bars of their respective switches and being driven rotatively by the associated rotatable element, slow-to-release relays allocated one to each of said secondary switches and each having an energizing circuit including said master brush and said first brush of the secondary switch to which the relay is allocated, each of said relays having a set of relay contacts, a final relay, and circuit connections from the respective second brushes to the contacts of the related relay, said circuit connections being arranged in parallel and being connected to one end of the operating coil of said final relay to afford an energizing circuit for said final relay including said master brush and any one of said contacts that may be closed.

5. In an apparatus for detecting variation from a desired speed relation among at least three relatively rotatable elements in excess of a predetermined rate of variation, said apparatus comprising a single-brush master commutator and a plurality of multiple brush secondary commutators, a plurality of slow-to-release control relays each having a pair of normally open relay contacts and said relays being allocated one to each of said secondary commutators and each of said relays having one terminal connected to one side of a source of current and their other terminals independently connected electrically with one brush of the related secondary commutator, means electrically connecting the single brush of said master commutator to the other side of said source, each of said commutators including a series of commutator bars arranged consecutively about a circle and the brushes of each commutator being driven by one of said elements, means electrically connecting certain of the bars of said single brush commutator respectively with corresponding commutator bars of each of said multiple brush commutators, the commutator bars of said single brush commutator which are electrically connected to the commutator of each multiple brush commutator being different from those commutator bars of said single brush commutator switch that are electrically connected to other commutator bars, a final relay having one terminal connected to one side of a source of current and having the other terminal connected to one side of the relay contacts of each of the respective slow-to-release relays in parallel, said relay contacts having connections from the other sides thereof to the respective other brushes of said secondary commutators and said connections each including a rectifier.

6. In an apparatus for detecting variation from a desired speed relation among at least three relatively rotatable elements in excess of a predetermined rate of variation, said apparatus comprising a single brush master commutator and a plurality of multiple brush secondary commutators, a plurality of slow-to-release control relays each having a pair of normally open relay contacts and said relays being allocated one to each of said secondary commutators and each of said relays having one terminal connected to one side of a source of current and their other terminals independently connected electrically with one brush of the related secondary commutator, means electrically connecting the single brush of said master commutator to the other side of said source, each of said commutators including a series of commutator bars arranged consecutively about a circle and the brushes of each commutator being driven by one of said elements, means electrically connecting certain of the bars of said single brush commutator respectively with corresponding commutator bars of each of said multiple brush commutators, the commutator bars of said single brush commutator which are electrically connected to the commutator of each multiple brush commutator being different from those commutator bars of said single brush commutator switch that are electrically connected to other commutator bars, a final relay having one terminal connected to one side of a source of current and having the other terminal connected to one side of the relay contacts of the respective slow-to-release relays in parallel, said relay contacts having connections from the other side thereof to the respective other brushes of said secondary commutators.

7. In a device for detecting the need for a control operation in respect to a pair of relatively rotatable elements in order to maintain the relative speed thereof within a predetermined range of variation, the combination of a master commutator and a secondary commutator each having a rotor adapted to be secured to one of said elements for rotation therewith, a commutator housing for each of said commutators adapted to be stationarily mounted about their respective rotors, said housings having correspondingly formed commutator surfaces with at least certain of corresponding commutator bars of the two housings electrically connected, said master commutator having a master brush and said secondary commutator having first and second angularly spaced brushes associated with the respective rotors for contacting their respective commutator surfaces, a slow-to-release relay having a pair of normally open contacts, an energizing circuit for said relay arranged to be closed when said master brush and said first brush contact two electrically connected commutator bars of the two commutators, and a detecting circuit including said relay contacts and arranged to be closed when said master brush and said second brush contact two electrically connected commutator bars of the two commutators while said relay contacts are closed.

8. In a control apparatus for locomotives having a plurality of wheels at least certain of which are power driven and having means including a controlling electrically operated device for reducing the driving power to such driven wheels, electrical detecting means operable to detect objectional speed differences between such wheels and effective when such a speed difference is detected to render said electrically operable device operable to reduce the power to such driven wheels for a predetermined normal control period, a safety cut-out switch operatively associated with said electrical detecting means for disabling said electrical detecting means when more than a predetermined number of such normal controls take place in rapid succession, an indicating device operable successively and intermittently by said detecting means to indicate each such normal control period, means governed by said cut-out switch when said detecting means are disabled to render said indicating device continuously effective, and means associated with and operated by said last mentioned means to render said electrically operable device continuously effective to reduce the driving power when said cut-out switch has disabled said detecting means.

9. In a control apparatus for locomotives having a plurality of wheels at least certain of which are power driven. and having means including a controlling electrically operated device for reducing the driving power to such driven wheels, electrical detecting means operable to detect objectionable speed differences between such wheels and effective when such a speed difference is detected to render said electrically operable device operable to reduce the power to such driven wheels for a predetermined normal control period, a safety cut-out switch operatively associated with said electrical detecting means for disabling said electrical detecting means when a control period extends beyond said normal period by substantially a predetermined amount or when more than a predetermined number of such normal controls take place in rapid succession, an indicating device operable successively and intermittently by said detecting means to indicate each such normal control period, and means governed by said cut-out switch when said detecting means are disabled to render said indicating device continuously effective.

10. In a control apparatus for locomotives having a plurality of independently rotatable wheels at least certain of which are power driven and having means including a controlling electrically operated device for reducing the driving power to such driven wheels, electrical detecting means including detecting circuits operable to detect objectionable speed differences between such wheels and effective when such a speed difference is detected to render said electrically operable device operable to reduce the driving power to such driven wheels for a predetermined normal control period, a safety cut-out switch having contacts included in said detecting circuits and having an operating coil operatively associated with said electrical detecting means for opening said cut-out switch and disabling said electrical detecting means when more than predetermined number of such normal controls take place in rapid succession, an indicating device operable successively and intermittently by said detecting means to indicate each such normal control period, a protection relay having an energizing circuit including said cut-out switch and having contacts arranged to render said indicating device continuously effective when said protection relay is released by opening of said cut-out switch, and means associated with and operated by said protection relay to render said electrically operable device continuously effective to reduce the driving power when said cut-out switch is thus opened.

11. In a control apparatus for locomotives having a plurality of independently rotatable wheels at least certain of which are power driven and having means including a controlling electrically operated device for reducing the driving power to such driven wheels, electrical detecting means including detecting circuits and operable to detect objectional speed differences between such wheels and effective when such a speed difference is detected to render said electrically operable device operable to reduce the driving power to such driven wheels for a predetermined normal control period, a safety cut-out switch having contacts included in said detecting circuits and having an operating coil operatively associated with said electrical detecting means for opening said cut-out switch and disabling said electrical detecting means when more than a predetermined number of such normal controls take place in rapid succession, an indicating device operable successively and intermittently by said detecting means to indicate each such normal control period, and a protection relay having an energizing circuit including said cut-out switch and having contacts arranged to render said indicating device continuously effective when said protection relay is released by opening of said cut-out switch.

12. In detecting apparatus for detecting the need for a control operation in respect to three or more relatively rotatable elements in order to maintain the relative speed thereof within a predetermined range, a plurality of commutators adapted for operative connection with the respective rotatable elements, one of said commutators constituting a master commutator and having an annular series of commutator bars, and each of the other commutators constituting a secondary commutator and each having an annular series of commutator bars, a plurality of main conductors connected respectively to different commutator bars in said master commutator, and branch leads each including a rectifier and connecting each main conductor to corresponding commutator bars in each of said secondary commutators.

13. In detecting apparatus for detecting the need for a control operation in respect to three or more relatively rotatable elements in order to maintain the relative speed thereof within a predetermined range, a master commutator and a pluarlity of secondary commutators each including a group of commutator bars correspondingly arranged in an annular relation, said secondary commutators having a plurality of independent branch leads extended from the respective commutator bars thereof, a plurality of main leads extended from the respective commutator bars of said master commutator and connected to the respective branch leads that extend from the respective corresponding bars of said secondary commutators, each of said branch leads including a rectifier, brush means included in the respective commutators, and independent control circuits each including the brush means of said master commutator and the brush means of one of said secondary commutators.

14. In detecting apparatus for detecting the need for a control operation in respect to three or more relatively rotatable elements in order to maintain the relative speed thereof within a predetermined range, a master commutator and a plurality of secondary commutators each including a group of commutator bars correspondingly arranged in an annular relation, said secondary commutators having a plurality of independent branch leads extended from the respective commutator bars thereof, a plurality of main leads extended from the respective commutator bars of said master commutator and connected to the respective branch leads that extend from corresponding bars of said secondary commutators, each of said branch leads including a rectifier, brush means included in the respective commutators, and independent control circuits including the respective brush means of the different secondary commutators and including the brush means of said master commutator as a common element of all of said independent control circuits.

15. In detecting apparatus for detecting the need for a control operation in respect to three or more relatively rotatable elements in order to maintain the relative speed thereof within a predetermined range, a master commutator and a plurality of secondary commutators each including a group of commutator bars correspondingly arrange in an annular relation, said secondary commutators having a plurality of independent branch leads extended from the respective commutator bars thereof, a plurality of main leads extended from the respective commutator bars of said master commutator and connected to the respective branch leads that extend from corresponding bars of said secondary commutators, each of said branch leads including a rectifier, a master brush included in said master commutator, at least two secondary brushes in angularly spaced relation included in each of said secondary commutators, and independent control circuits including the respective secondary brushes and including the master brush as a common element of all of said independent control circuits.

References Cited in the file of this patent

UNITED STATES PATENTS

| | | |
|---|---|---|
| 1,053,946 | Gaumont | Feb. 18, 1913 |
| 2,335,984 | Wilson | Dec. 7, 1943 |
| 2,516,198 | Frier | July 25, 1950 |